US005118138A

United States Patent [19]

Brotz

[11] Patent Number: 5,118,138

[45] Date of Patent: Jun. 2, 1992

[54] SELF-ILLUMINATING BOOK

[76] Inventor: Gregory R. Brotz, P.O. Box 1322, Sheboygan, Wis. 53081

[21] Appl. No.: 765,517

[22] Filed: Sep. 25, 1991

[51] Int. Cl.[5] .................... B82D 3/00

[52] U.S. Cl. .................... 281/51; 281/36; 402/80 R

[58] Field of Search .................... 281/36, 37, 51; 402/80 R

[56] References Cited

U.S. PATENT DOCUMENTS 2,685,638 8/1954 Littrell .................... 281/51 X

FOREIGN PATENT DOCUMENTS 685778 12/1939 Fed. Rep. of Germany .................... 281/51

860908 12/1952 Fed. Rep. of Germany .................... 281/51

*Primary Examiner*—Paul A. Bell

*Attorney, Agent, or Firm*—William Nitkin

[57] ABSTRACT

A book having self-illuminating pages, each page utilizing transparent sheets sandwiched around an opaque sheet with indicia imprinted on the transparent sheets illuminated by a light source within the spine of the book passing light in through the edges of the transparent sheets facing the spine, such light passing through the planar body of the transparent sheets, illuminating the indicia imprinted thereon.

4 Claims, 2 Drawing Sheets

SELF-ILLUMINATING BOOK

BACKGROUND OF THE INVENTION

1. Field of the Invention

The device of this invention relates to pages of a book which can be read without the necessity of ambient light and more particularly relates to a book having a built-in light source for illumination of the pages from within.

2. Description of the Prior Art

It has been appreciated by non-braille readers that in order to read a non-braille book one must have ambient light to reflect off the pages of such book. Prior to this invention such ambient light was provided by an external light source.

SUMMARY OF THE INVENTION

It is a goal of this invention to provide a book with self-illuminated pages so that the pages can be read without any ambient light present. This invention can be useful in dark areas such as encountered during the night or in areas without electricity.

The structure of the book of this invention provides for pages of plastic transparent sheets sandwiched around a sheet of opaque material with printing of ink including fluorescing ink on the inside of each sheet of transparent material. A built-in illumination source illuminates the area within the spine of the book to illuminate the pages therein from their inside edge which illumination travels within and illuminates throughout the interior of the transparent sheet material, thereby illuminating the ink printed thereon, making it visible to someone viewing the page from its face surface even if there is no ambient light present and thereby allowing such book to be read in total darkness.

DESCRIPTION OF THE PREFERRED EMBODIMENT(S)

Figure 1:
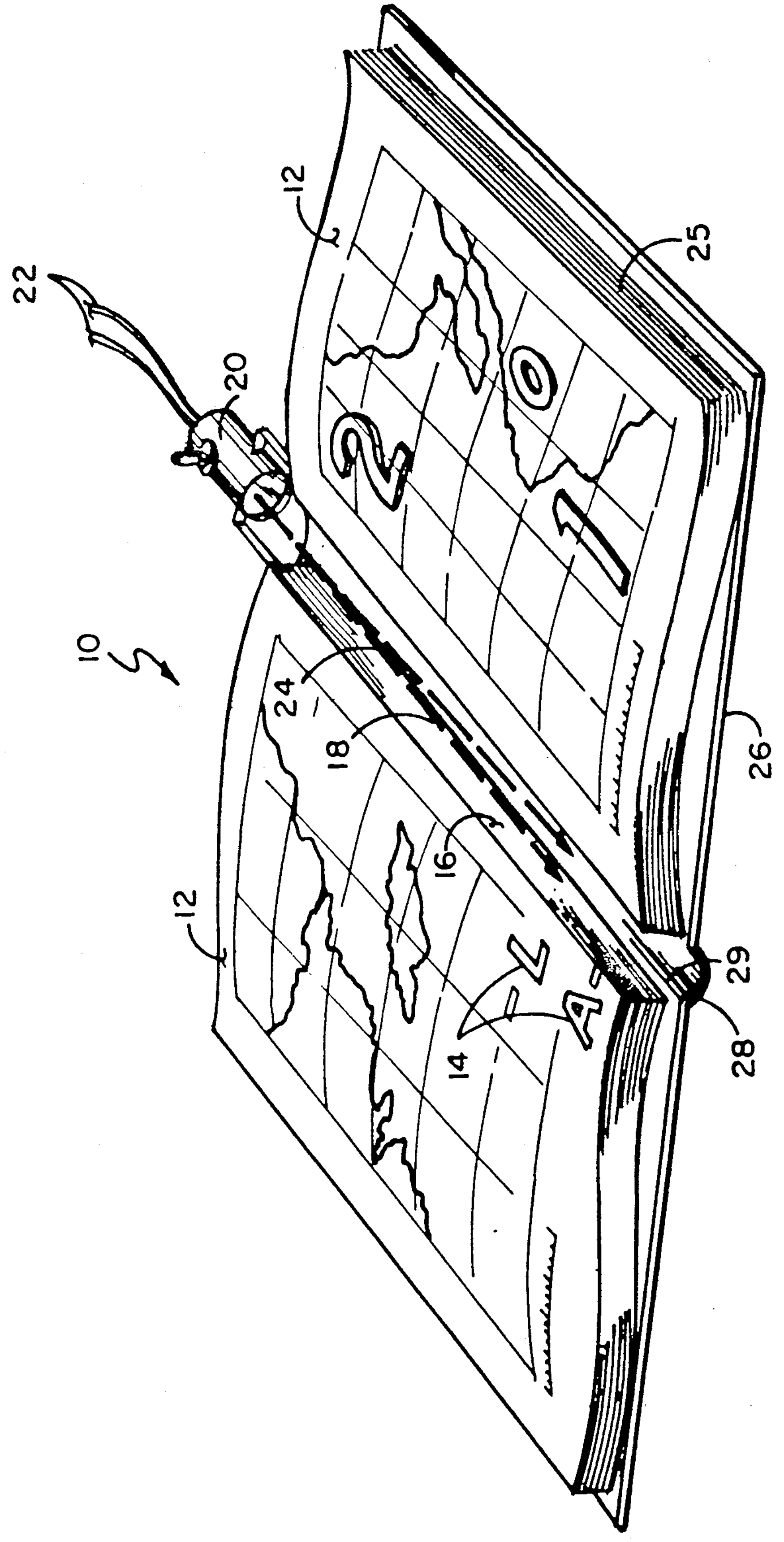
FIG. 1 illustrates a book having a plurality of pages to be illuminated by light coming down the spine of the book of this invention from a self-contained light source, such light passing through the inside edges of the pages to illuminate the printing thereon.

FIG. 1 illustrates a book 10 having a plurality of pages 12. The sides 16 of the pages near spine 28 are shown open from one another with an area 18 in which light beams 24 are passed from a light source 20. In practice pages 12 would be joined, inclosing area 18 which also can be blocked at end 29 of the spine area. Light source 20 can be battery-operated light source from a traditional incandescent bulb or can even be provided by a battery-operated fluorescent light or black light extending down along spine 28. The light can also be powered from an external electric source such as coming through electric cord 22. The pages have printing 14 thereon or other indicia such as maps as seen on the pages illustrated in FIG. 1. Spine 28 of the book can be connected to book cover 26, and the book can open and close and the pages turned in the normal manner.

Figure 2:
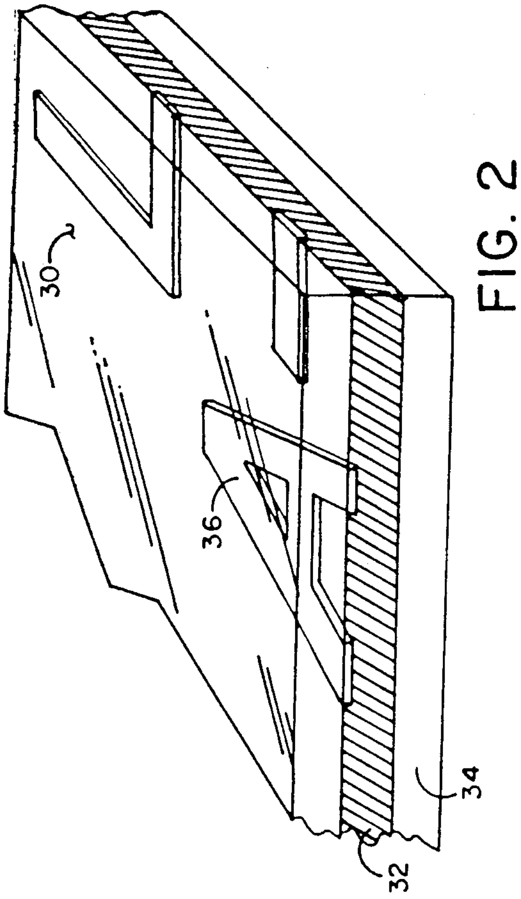
FIG. 2 illustrates an enlarged cutaway sectional view of a page of the book of this invention.

The pages, as seen in the cutaway sectional view of FIG. 2, are made of an upper transparent plastic sheet 30, which can be of acrylic plastic or equivalent, on the bottom of which is printed indicia 36 being the words or other things to be viewed. A similar bottom transparent sheet 34 also has indicia printed thereon, and these flexible transparent plastic sheets are separated by an opaque sheet 32 so that one cannot read bottom transparent sheet 34 through upper transparent sheet 30. Each page can be made of a thin transparent plastic sheet which along its inside edge receives light from a central light source in the spine of the book which light will pass through the entire sheet, illuminating printing thereon which will become visible against the dark background of opaque sheet 32. In this way the plastic sheet transmits the light throughout its body from its entry at the sheet's edge facing toward the spine of the book. The other edges 25 of the page can be made opaque with a coating so that light does not shine outward along such other outer edges which light emission can be distracting to the reader of the book of this invention.

Figure 3:
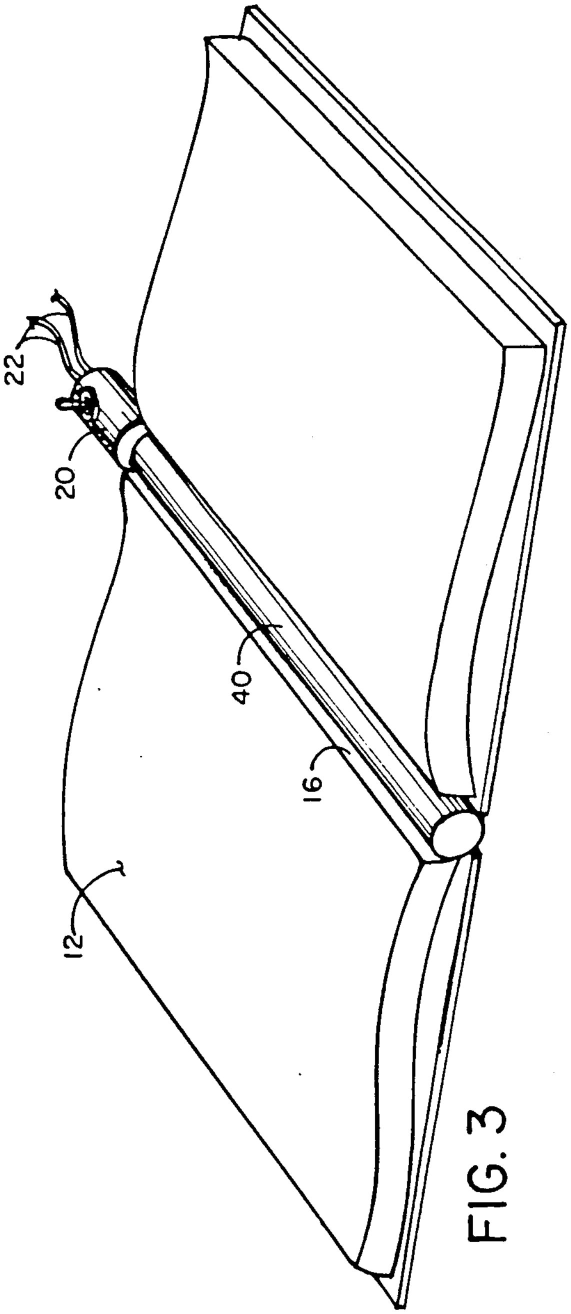
FIG. 3 illustrates an alternate embodiment of a light source providing illumination within the spine of the book of this invention.

An alternate embodiment of the book of this invention is seen in FIG. 3 wherein a light-transmitting member 40 such as a fiber optic or other optical path transmitter carries light down the inside edges of the pages for transmission out through the body of such pages so that any indicia imprinted thereon can be seen by someone observing the pages even in total darkness since the self-contained light would make all indicia imprinted on the page easily visible. The light-transmitting member can be a round or oval rod as shown or other shape. The light-transmitting member does not have to be in contact with the page edges as light will escape from the light-transmitting member and travel through the space between it and the page edge. The surface of the light-transmitting member can be roughened by vapor blasting or equivalent process so that it will uniformly transmit light around its outer surface. If the invention is practiced with black light and fluorescing inks, the resulting effect can be very bright.

In some embodiments the bottom edge of spine 28 can have a cap in area 29 to prevent extraneous light from passing out the end of spine 28, and a reflective surface can also be used within the spine to amplify light source 20 to better reflect it toward the inside edges 16 of pages 12.

Although the present invention has been described with reference particular embodiments, it will be apparent to those skilled in the art that variations and modifications can be substituted therefor without departing from the principles and spirit of the invention.

I claim:

1. A book having a spine, comprising:

a light source within said spine;

a plurality of composite pages having at least one side edge facing toward said spine, each of said pages having a flexible top transparent sheet, a flexible opaque sheet and a flexible transparent bottom sheet, said composite page able to transmit light emanating from said light source within said spine throughout the planar body of said composite page; and indicia imprinted on said transparent sheets made visible by said light source to an observer of said pages.

2. The book of claim 1 wherein the edges of the non-spine-facing sides of said pages are coated making said edges opaque.

3. The book of claim 1 wherein said light source is a black light source and wherein said indicia are printed with fluorescing inks.

4. The book of claim 1 wherein said light source includes a light-transmitting member extending the length of said spine to transmit light along the spine of said book.

* * * * *